United States Patent [19]

Pierce et al.

[11] Patent Number: 5,345,367
[45] Date of Patent: Sep. 6, 1994

[54] THIN FORM FACTOR COMPUTER CARD

[75] Inventors: Michael E. Pierce, Orangeville; John A. Horn, Davis; Duncan D. MacGregor, Shingle Springs, all of Calif.

[73] Assignee: Intel Corporation, Santa Clara, Calif.

[21] Appl. No.: 948,689

[22] Filed: Sep. 22, 1992

[51] Int. Cl.$^5$ .............................................. G08B 5/22
[52] U.S. Cl. ........................................ 362/32; 362/253; 362/800; 340/653
[58] Field of Search ................. 362/32, 253, 800; 206/328, 334, 454; 116/202; 340/653, 686, 687; 364/559

[56] References Cited

U.S. PATENT DOCUMENTS

| | | | |
|---|---|---|---|
| 4,359,222 | 11/1982 | Smith, III et al. | 340/286 |
| 4,524,269 | 6/1985 | Ezawa et al. | 340/686 |
| 4,907,118 | 3/1990 | Hames | 340/653 |
| 4,940,969 | 7/1990 | Taylor | 340/653 |
| 5,016,147 | 5/1991 | Voorhees | 362/800 |
| 5,068,652 | 11/1991 | Kobayashi | 362/800 |

FOREIGN PATENT DOCUMENTS 0064802  4/1982  Japan ..................... 340/653

*Primary Examiner*—Ira S. Lazarus
*Assistant Examiner*—Y. Quach
*Attorney, Agent, or Firm*—Blakely Sokoloff Taylor & Zafman

[57] ABSTRACT

A right-angle surface-mounted light-emitting diode is mounted on a printed circuit board within a thin form factor computer cartridge. The LED is mounted, inside the cartridge assembly, close to, and facing toward, the opaque edge of the cartridge. The edge of the cartridge frame has a small diameter hole, through which a clear light-transmitting material is installed. This light-transmitting material forms a light pipe which conducts the light emanating from the LED out of the card.

20 Claims, 2 Drawing Sheets

THIN FORM FACTOR COMPUTER CARD

BACKGROUND OF THE INVENTION (1) Field of the Invention

The present invention relates to status indicator lights for computer systems. More specifically, the present invention implements status indicator lights in thin form factor computer cards.

(2) Art Background

It is quite common for computer systems to have a slot into which may be inserted a thin form factor memory cartridge. A "memory cartridge" is a plug-in module containing random access memory (RAM)) chips that can be used to store data or programs. Memory cartridges are used primarily in portable computers as smaller, lighter, substitutes for disk drives. Memory cartridges typically use a nonvolatile form of RAM which does not lose its contents when power is turned off, or battery-backed RAM, which maintains its contents by drawing current from a rechargeable battery within the cartridge.

To encourage the development of memory cartridges, various standards have been established. One such standard was established by the Personal Computer Memory Card Industry Association (PCMCIA). However, other standards exist, for example, in Japan, JEIDA is the equivalent association to PCMCIA.

The PCMCIA PC Card Standard 2.0 outlines the architecture and specifications for an interchangeable integrated circuit card, with both data storage ("Memory") and peripheral expansion ("I/O") card types defined. Cards interface through a standard 68-pin connector to operate interchangeably in the same 68-pin slot of a host computer system. A variety of devices are now, or will soon be, available, such as RAM, dynamic RAM (DRAM), and flash memory storage products, as well as, modem, facsimile (fax), local area network (LAN), small computer system interface (SCSI) and wireless I/O applications.

The PCMCIA standard primarily defines physical specifications for an interchangeable card. For example, PCMCIA specifies that the width and length of a card must be exactly the same size as that of a credit card. Furthermore, the thickness is specified to be 130 thousandths of an inch (3.3 millimeters) along the edge of the card, and then the center area of the card is allowed to have a maximum thickness of 197 thousandths of an inch (5 millimeters). However, the PCMCIA standard, by itself, does not guarantee interoperability. While it establishes some electrical and software requirements, these requirements are not stringent enough to guarantee that a PCMCIA card will function properly in every manufacturer's PCMCIA slot. Therefore, the exchangeable card architecture (ExCA) standard, which is an extension of the PCMCIA standard, was developed by Intel Corporation. ExCA is a clarifying enhancement of the PCMCIA specification that guarantees interoperability between cards.

Memory cards typically do not have status indicator lights. However, it is desirable for I/O devices to have status indicator lights. An example of a prior art status indicator light for an I/O device is a power light to indicate that the unit has electric power supplied to it. Another example is a link integrity light for a LAN which lights to indicate that the network is functioning properly. Additionally, modems often have transmit and receive indicator lights that light when the modem is respectively transmitting or receiving data.

It is common for the status indicator lights of I/O devices to be light-emitting diodes (LEDs). A LED is a semiconductor device that converts electrical energy into light. LEDs work on the principle of electroluminescence and are highly efficient, producing relatively little heat for the amount of light which is output. Most LEDs are red, although yellow, green and blue LEDs are available. LEDs are also available that emit light in the infrared and ultraviolet ranges.

A right angle surface mount LED is designed to mount to the surface of a printed circuit board (PCB) such that light from the LED is emitted parallel to the surface of the PCB. This is in contrast to more commonly used surface mount LEDs which emit light perpendicularly to the surface of the PCB to which they are mounted. A small form factor right angle surface mount LED is manufactured by the Dialight Company, Manasquan, N.J.

Light pipes are also well known in the art and widely used. A light pipe is an extruded material, such as certain plastic filaments, which provides a path for light. A light pipe is typically used when it is desirable to mount an LED which will act as the light source to a PCB for ease of manufacture, but it is desirable to see the light from the LED at a place remote from the location of the LED. The light pipe is then used to transmit the light from the LED to the remote location. Typical places where light pipes are used include: LED indicators for personal computers, speedometers on automobile dashboards, or consumer electronic components such as video cameras.

The PCMCIA/ExCA specification requires the exterior of an entire card to be opaque. Furthermore, because of the small size of the PCMCIA card, standard LEDs are too large to protrude, or shine diffusely, through the card frame. Therefore, prior art PCMCIA cards have been manufactured without status indicator lights.

Alternately, LEDs have previously been installed into peripheral adapter cables or modules that are connected into PCMCIA I/O Cards. That approach uses additional conductors and pins on the external connector, and increases the bulk of the adapter module itself. A critical requirement for any adapter cable is that it be as small, thin and flexible as possible. Thus, as more LEDs are incorporated into the adapter module, the size increases beyond acceptable limits, and the cable increases in size and becomes less flexible.

SUMMARY OF THE INVENTION

It is therefore an object of the present invention to provide status indicator lights for the edge of a thin form factor computer cartridge which is visible when the cartridge is inserted into the computer cartridge slot.

It is a further object of the present invention to reduce the power requirements of the status indicator lights while maintaining an acceptable level of perceptibility.

It is a further object of the present invention to provide the status indicator lights in the computer cartridge while maintaining an appearance of computer cartridge opacity.

It is a further object of the present invention to provide indicator lights for thin form factor computer cards while eliminating the need to place the indicator lights in a separate module coupled to the computer card.

Furthermore, it is an object of the present invention to satisfy the above-mentioned objects of the present invention in a way which is inexpensive to implement.

An apparatus and method is disclosed for providing at least one status indicator on the thin edge of a thin form factor computer cartridge such that the indicator is visible when the cartridge is inserted into a computer cartridge slot.

The invention uses a right-angle surface-mounted light-emitting diode (LED). The LED is mounted on a printed circuit board (PCB) within the cartridge, inside the assembly, close to, and facing toward, the edge of the card. The edge of the card frame is modified by drilling a small diameter hole, through which a clear light-transmitting material is installed. This light-transmitting material forms a light pipe which conducts the light emanating from the LED out of the card.

The light pipe diameter is actually smaller than the LED itself, and catches almost all of the light emanating from the LED. The concentrated light emitted from the light pipe, though smaller in diameter, is brighter than the typical unfocused scattered light from the LED, and can be viewed over a wide angle. The light is enhanced by the contrast of a dark card frame color background. The structural integrity of the frame is not significantly compromised.

The material of the light pipe appears as opaque as the rest of the card when the LED is extinguished, and the outside edge is flush with the surface of the card frame, so that these mechanical modifications do not violate any of the PCMCIA/ExCA specifications.

The present invention is a low cost solution for fulfilling the requirement of status indicators for the thin form factor computer card. By using the light pipe to concentrate the light from the LED into a small area, it permits reduction of power to the LED thereby reducing critical system power consumption.

One embodiment of this invention is incorporated into a PCMCIA/ExCA Local Area Network (LAN) I/O card for IEEE 802.3 10 BASE-T ("Twisted Pair Ethernet") and IEEE 802.3 10 BASE-5 ("Thick Ethernet"), which requires LED status indicators. Previously, the LED status indicator lights were contained in a module of a cable assembly which attached to the LAN card. In this embodiment, the size of an adapter cable assembly was significantly reduced by the present invention because it permitted the LED indicators to be relocated from the cable assembly module to the LAN card. Furthermore, the conductors in the adapter cable which had been used to provide power and control to the LED indicators in the module of the adapter cable assembly could be put to other uses. In this way, one LAN I/O card layout can support both types of 802.3 Ethernet interfaces through the same adapter connector.

BRIEF DESCRIPTION OF THE DRAWINGS

The objects, features and advantages of the method and apparatus of the present invention will be apparent from the following detailed description of the invention in which.

DETAILED DESCRIPTION OF THE INVENTION

An apparatus and method is disclosed for providing status indicator lights on a thin edge of a thin form factor computer cartridge. In the following description, for the purposes of explanation, specific devices, signals and data structures are disclosed in order to more thoroughly understand the present invention. However, it will be apparent to one skilled in the art that the present invention may be practiced without these specific details. In other instances, well-known circuits, devices and data structures are not disclosed herein to avoid obscuring the present invention unnecessarily.

Figure 1:
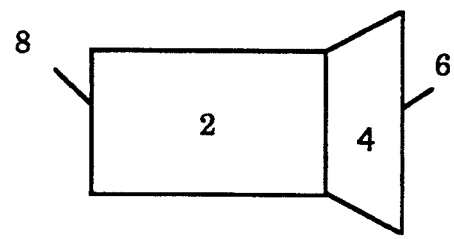
FIG. 1 illustrates a top view of an optical waveguide.

Referring now to FIG. 1, a top view of an optical waveguide 16 is depicted. Optical waveguide 16 is a cylindrical light pipe which causes a light concentrating effect. Light enters a funnel through receptor edge 6 and funnels through funnel 4 before entering transmission cylinder 2. The concentrated light leaves waveguide 16 through transmitter edge 8.

Figure 2:
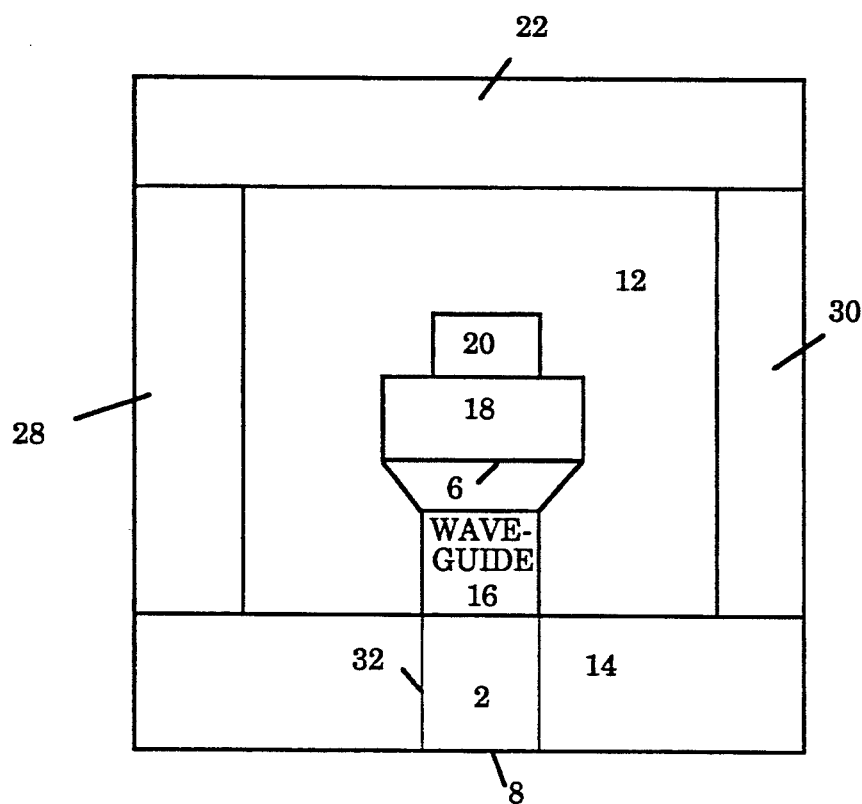
FIG. 2 illustrates a top view of a computer cartridge with its top cover removed wherein the cartridge contains a status indicator of the present invention.

Referring now to FIG. 2, a top view of a computer cartridge 10 containing a status indicator which uses the teachings of the present invention is depicted.

In one embodiment of the present invention, computer cartridge 10 is designed to conform to the thin form factor computer cartridge PCMCIA/ExCA standard. However, it will be apparent to one skilled in the art that the teachings of the present invention are readily extensible to other thin form factor computer cartridges. In fact, the present invention may be used in any application where a status indicator which occupies a small display area is desired.

Referring now to FIG. 2, edges 14, 22, 28 and 30 together form a thin card frame for computer cartridge 10. Edge 22 corresponds to the end of the cartridge 10 which is inserted into a computer system cartridge receptacle (not shown) of a computer system (not shown). When cartridge 10 is inserted into the receptacle, the exterior surface of edge 14 is visible through the outside surface of the computer system.

Cylinder 2 of optical waveguide 16 is inserted into a hole 32 in edge 14 so that transmitter edge 8 of waveguide 16 aligns collinearly with the exterior surface of edge 14. Light source 18 is coupled to optical waveguide 16 and to light source controller 20. Light source 18 and controller 20 are mounted to printed circuit board (PCB) 12. PCB 12 is attached to the card frame.

The card frame is a black polycarbonate plastic frame that supports the PCB 12, and bottom 26. Light source 18 emits light when activated by the controller 20. The light source projects light into receptor edge 6 of optical waveguide 16 which funnels and transmits the light through hole 32 in the cartridge 10, so that the light is visible at transmitter edge 8.

Light source 18 is a small form factor right angle surface mount light-emitting diode (LED) of a kind manufactured by the Dialight Company, Manasquan, N.J. LEDs are well known in the art and widely used. A "LED" is a semiconductor device that converts electrical energy into light. LEDs work on the principle of electroluminescence and are highly efficient, producing relatively little heat for the amount of light output. Most LEDs are red, although yellow, green and blue LEDs are available. Multiple or bi-colored LEDs are also available.

A right angle surface mount LED is designed to mount to the surface of a PCB such that light from the LED is emitted parallel to the surface of the PCB. This is in contrast to more commonly used surface mount LEDs which emit light perpendicularly to the surface of the PCB to which they are mounted.

The LEDs of one embodiment of the present invention are green. However, it will be apparent to one skilled in the art that there is nothing unique about the LEDs can be many colors. An example of a possible application of a bi-colored LED in an embodiment of the present invention is a transmit and receive indicator light for a modem wherein the indicator light displays a first color when the modem is transmitting and a second color when the modem is receiving. Neither is the present invention limited to LEDs which operate only in the visible spectrum. There are LEDs that operate in other spectra beside the visible (e.g. ultra-violet or infrared LEDs). In fact infra-red is very important for future applications of the present invention. An example of a possible application is an infra-red link for a wireless local area network (LAN). In this example, optical waveguide 16 would be constructed of a material that is optically transparent to infra-red light in order to conduct or guide the infra-red light.

It will be obvious to one skilled in the art that light source 18 need not be a LED. In an alternate embodiment, light source 18 could operate on some other principle than electroluminescence. For example, light source 18 could be an incandescent light, or a different type of semiconductor device, such as a laser diode.

The LED of light source 18 is controlled by light source controller 20. Controller 20 causes light source 18 to emit light or not emit light depending upon the existence or not of a particular state. For example, if the present invention were being used to provide a "power on" status indicator, controller 20 would cause light source 18 to emit light when power was supplied to cartridge 10. When power was not supplied to cartridge 10, controller 20 would prevent light source 18 from emitting light. In this way, controller 20 operates like a light switch to turn on and off light source 18.

Furthermore, controller 20 need not be physically located in cartridge 10. It is merely sufficient that controller 20 be coupled to light source 18. For example, controller 20 could reside within the computer to which cartridge 10 has been inserted. Pins in the receptacle would then couple controller 20 to light source 18.

In addition, light source 18 need not be constrained to a simple digital (two state, i.e. on/off) signal. Techniques are well known in the art for controller 20 to modulate the intensity of light emitted from light source 18 thereby permitting an analog signal to be transmitted by light source 18. It is also possible for controller 20 to use time division multiplexing schemes that are well known in the art to cause light source 18 to emit a bit stream digital signal thereby transmitting a signal that has a large information content.

In one embodiment, optical waveguide 16 is a cylindrical light pipe. However, it will be obvious to one skilled in the art that waveguide 16 could have other shapes (e.g. rectangular, hexagonal, etc.). There are various ways well known in the art that optical waveguide 16 can be inserted into hole 32 of edge 14 such that waveguide 16 will stay in the cartridge 10 without becoming loose.

Because optical waveguide 16 is a light pipe which tapers down or funnels, there is a light concentrating effect. Waveguide 16 essentially receives the LED output, and funnels the light photons down into the center of the light pipe. By funneling the light into a smaller area, the status indicator is brighter. The human eye is much more sensitive to contrast than it is to actual light levels. Therefore, one can see the contrast of the compact display area better.

This effect permits a lower power to be used to light the LED, which is a critical design requirement in this type of card. By having a smaller display that is still bright, less power is required to drive a LED which emits a noticeable brightness. For example, LEDs, typically require about 10 milliamps to be seen clearly. The funneling achieved by waveguide 16 enables the LED to be powered by only one milliamp.

Care must be taken to isolate the light pipe from incident light within the cartridge 10. When the cover is removed, this surface of the light pipe is exposed to ambient light. Therefore incident light is captured, and the light pipe transmits light. When the cover is on, and the LED is not lit, the light pipe is dark.

For example, in one embodiment of the present invention, there are two LEDs. However, the light from each LED does not shine throughout the card. Each LED only shines in one direction such that light from one LED does not shine through the light pipe of the other LED. The light only goes through its corresponding light pipe. If something else were to emit light inside the card, opaque paint can be placed on the exterior of the light pipe at the locations where the unwanted light would enter the pipe.

Alternately, if a component emits a non-directional light, or a multiplicity of LEDs are grouped compactly, the tooling of cartridge 10 may include an opaque physical barrier that would isolate each LED and its corresponding light pipe from the other LEDs and corresponding light pipes. Alternately, the LED and light pipe can be encapsulated within an opaque material that would prevent any incident radiation from coming through.

However, it will be obvious to one skilled in the art that optical waveguide 16 need not be a light pipe. For example, in an alternate embodiment of the present invention, which does not require the light concentrating effect of a light pipe, optical waveguide 16 could be configured to be a fiber optic strand. Furthermore, if light source 18 were placed against edge 14, optical waveguide 16 could be eliminated.

Figure 3:
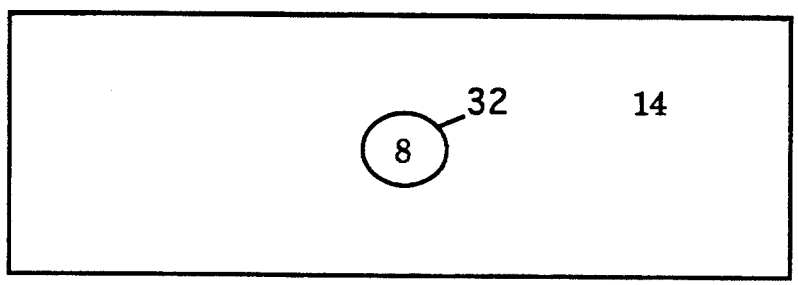
FIG. 3 illustrates a front view of the computer cartridge of FIG. 2 as it would be visible when inserted into a cartridge receptacle of a computer.

Referring now to FIG. 3, a front view of cartridge 10 is depicted. This is a view as would be seen from the exterior surface of a computer system when cartridge 10 is inserted into the receptacle of the computer system. Edge 14 contains a hole 32 into which the optical waveguide is mounted so that transmitter edge 8 of the optical waveguide is visible from the exterior of the computer system when cartridge 10 is inserted into the receptacle.

When the light source is "off", with incident light to the optical waveguide blocked, transmitter edge 8 of the clear light pipe appears to be dark or a similar color to the polycarbonate edge 14. When the light source comes "on", the optical waveguide transmits the light from the light source, through the light pipe, to show the status indicator at transmitter edge 8.

The status indicator is not a bright light, but can be seen from a wide range of viewing angles. When viewed perpendicularly to transmitter edge 8, the status indicator is brighter than when viewed at any other angle.

It will be obvious to one skilled in the art that edge 14 is not constrained to be a black or opaque. In an alternate embodiment, edge 14 is transparent or translucent, the hole 32 in edge 14 can then be eliminated and light from the light source is perceptible because it diffuses through edge 14.

Figure 4:
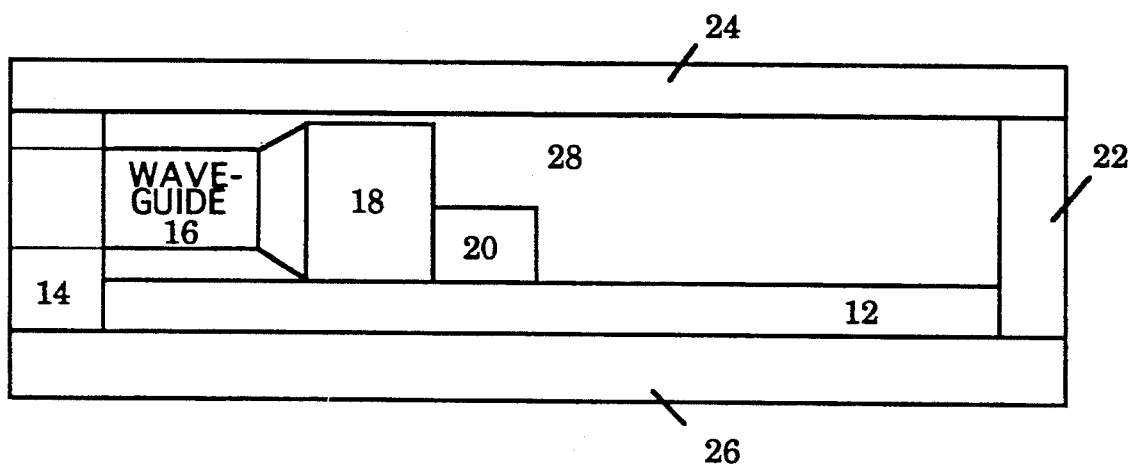
FIG. 4 illustrates an edge view of the computer cartridge of FIG. 2 with its side cover removed and top cover not removed.

Referring now to FIG. 4, a side view of cartridge 10 is depicted. This is a view as would be seen if edge 30 (FIG. 2) were removed from cartridge 10 and top 24 was not removed. In FIG. 4, the case for cartridge 10 is formed by top 24, base 26 and the frame which is comprised of edges 14, 22, 28 and 30 (FIG. 2). PCB 12 is mounted to the case adjacent, and parallel, to bottom 26. Optical waveguide 16 is inserted into edge 14 so that it aligns with the exterior surface of edge 14. Light source 18 is coupled to optical waveguide 16 and controller 20. Light source 18 and controller 20 are mounted to PCB 12.

One embodiment of this invention is incorporated into a Local Area Network (LAN) I/O card for IEEE 802.3 10 BASE-T ("Twisted Pair Ethernet") and IEEE 802.3 10 BASE-5 ("Thick Ethernet"), which requires LED status indicators. In this embodiment, an adapter cable assembly (not shown) is coupled to edge 14 of cartridge 10. The assembly is comprised of a flexible multi-conductor cable coupled to a connecting module containing an RJ-45 connector. The assembly is used for coupling the cartridge 10 to a LAN.

Prior to the present invention, the connecting module of the adapter cable assembly had also contained LED status indicator lights. However, the present invention permitted the status indicator lights to be relocated into edge 14 of cartridge 10. Therefore, since the cable assembly no longer contained LED status indicators, the size of the connecting module was reduced. Furthermore, conductors in the flexible cable which had been used to supply power and control signals to the LEDs were made available to be used for different functions. This permitted one LAN I/O card layout to support both types of 802.3 Ethernet interfaces using the same adapter connector. Alternately, the conductors which had been used by the LEDs in the connector module could have been eliminated from the flexible cable, thereby permitting a thinner flexible cable to be used in the cable assembly.

While the present invention has been particularly described with reference to FIGS. 1-4 and with emphasis on certain computer cartridges, it should be understood that the figures are for illustration purposes only and should not be taken as limitations upon the present invention. In addition, it is clear that the methods and apparatus of the present invention has utility in any application where a tiny status indicator is required for a small display area. It is contemplated that numerous alternatives, modifications, variations and uses may be made, by one skilled in the art, without departing from the spirit and scope of the invention as disclosed above.

What is claimed is:

1. In a computer cartridge having a small opaque display area, said display area containing a hole, and an indicator, said indicator indicating whether a first or second status exists, said indicator comprising:

a light source having a first state where substantially no light is emitted from said light source and a second state where a first intensity level of light is emitted from said light source;

means for controlling said light source, coupled to said light source, said means for controlling said light source placing said light source in said first state to indicate said first status and placing said light source in said second state to indicate said second status;

an optical waveguide means, coupled between said light source and said small display area, said optical waveguide means projecting through said hole and transmitting said light emitted from said light source to said small display area, when said small display area is viewed and said first state exists, said optical waveguide means not transmitting light and appearing to be opaque.

2. The indicator as set forth in claim 1, wherein said light source has a third state where a second intensity level of light is emitted from said light source, said second intensity level of light being different from said first intensity level of light and wherein said means for controlling said light source places said light source in said third state to indicate a third status.

3. The indicator as set forth in claim 1, wherein said optical waveguide means comprises a light pipe.

4. The indicator as set forth in claim 1, wherein said optical waveguide means concentrates said light from said light source as said optical waveguide means transmits said light to said small display area.

5. The indicator as set forth in claim 1, wherein said optical waveguide means comprises a fiber optic device.

6. The indicator as set forth in claim 1 wherein the light source is a solid state light-emitting device.

7. The indicator as set forth in claim 1 wherein the light source is a light-emitting diode.

8. The indicator as set forth in claim 1 wherein said computer cartridge further comprises a printed circuit board coupled perpendicularly to said display area, and wherein the light source is mounted to said printed circuit board, said light source emitting light in a direction which is oblique to said printed circuit board.

9. The indicator as set forth in claim 8 wherein said light source emits light of a first color when placed in said second state and said light source has a third state where light of a second color is emitted from said light source, said second color different from said first color and wherein said means for controlling said light source places said light source in said third state to indicate a third status.

10. The indicator as set forth in claim 1 wherein the light source is a laser diode.

11. The indicator as set forth in claim 1 wherein said means for controlling said light source varies the light emitted by said light source thereby transmitting a signal to said display area through said optical waveguide means having an information content greater than that of a simple two state signal.

12. In a computer cartridge having a small opaque display area containing a hole and a printed circuit board coupled perpendicularly to said display area, and an indicator, said indicator indicating whether a first or second status exists, said indicator comprising:

a light-emitting diode (LED), coupled to said printed circuit board and having a first state where substantially no light is emitted from said LED and a second state where a first intensity level of light is emitted from said LED, said LED emitting light in a direction which is substantially parallel to said printed circuit board surface;

means for controlling said LED, coupled to said LED, said means for controlling said LED placing said LED in said first state to indicate said first status and placing said LED in said second state to indicate said second status;

a light pipe, coupled between said LED and said display area, said light pipe projecting through said hole and transmitting said light emitted from said LED to said small display area such that when said display area is viewed and said first state exists, said light pipe does not transmit said light and appears to be opaque.

13. The indicator as set forth in claim 12 wherein said LED has a third state where a second intensity level of light is emitted from said LED, said second intensity level of light being different from said first intensity level of light and wherein said means for controlling said LED places said light source in said third state to indicate a third status.

14. The indicator as set forth in claim 12, wherein said light pipe concentrates said light from said LED as said light pipe transmits said light to said small display area.

15. The indicator as set forth in claim 12 wherein said LED emits a light of a first color when placed in said second state and said LED has a third state where light of a second color is emitted from said LED, said second color being different from said first color and wherein said means for controlling said LED places said light source in said third state to indicate a third status.

16. In a computer cartridge having a small opaque display area containing a hole and a printed circuit board coupled perpendicularly to said display area, a method for indicating whether a first or second status exists, said method comprising the steps of:

providing a light source, coupled to said mounting surface and having a first state where substantially no light is emitted from said light source and a second state where a first intensity level of light is emitted from said light source;

providing a light pipe, coupled between said light source and said display area, said light pipe projecting through said hole and transmitting said light emitted form said light source to said small display area such that when said display are is viewed and said first state exists, said light pipe does not transmit said light and appears to be opaque;

controlling said light source using a means for controlling said light source, coupled to said light source, said means for controlling said light source placing said light source in said first state to indicate said first status and placing said light source in said second state to indicate said second status.

17. The method, as set forth in claim 16, wherein said light source is a solid state light emitting device.

18. The method as set forth in claim 16, wherein said light pipe concentrates said light from said light source as said light pipe transmits said light to said small display area.

19. The method as set forth in claim 16, wherein said light source has a third state where a second intensity level of light is emitted from said light source, said second intensity level of light being different from said first intensity level of light, and wherein said means for controlling said light source can place said light source in said third state, said method further comprising the step of said means for controlling said light source placing said light source in said third state to indicate a third status.

20. The method as set forth in claim 16 wherein said light source emits light of a first color when placed in said second state and said light source has a third state where light of a second color is emitted from said light source, said second color being different from said first color and wherein said means for controlling said light source can place said light source in said third state, said method further comprising the step of said means for controlling said light source placing said light source in said third state to indicate a third status.

* * * * *

UNITED STATES PATENT AND TRADEMARK OFFICE
CERTIFICATE OF CORRECTION

PATENT NO. : 5,345,367
DATED : Sept. 6, 1994
INVENTOR(S) : Michael E. Pierce, et al It is certified that error appears in the above-indentified patent and that said Letters Patent is hereby corrected as shown below:

Column 8; Line 43; Delete "oblique"; Insert in place thereof--substantially parallel--

Signed and Sealed this

Nineteenth Day of September, 1995

Attest:

BRUCE LEHMAN

Attesting Officer

Commissioner of Patents and Trademarks